United States Patent [19]
Dent

[11] Patent Number: 5,764,646
[45] Date of Patent: Jun. 9, 1998

[54] PACKET DATA TRANSMISSION WITH CLASH SUBTRACTION

[75] Inventor: Paul W. Dent, Stehags, Sweden

[73] Assignee: Ericsson Inc., Research Triangle Park, N.C.

[21] Appl. No.: 626,350

[22] Filed: Apr. 2, 1996

[51] Int. Cl.$^6$ .............................. H04J 13/04; H04B 7/216
[52] U.S. Cl. ................................. 370/479; 370/342
[58] Field of Search .................................. 370/326, 335, 370/342, 479, 912, 913

[56] References Cited

U.S. PATENT DOCUMENTS

| | | | |
|---|---|---|---|
| 5,048,059 | 9/1991 | Dent | 375/340 |
| 5,063,573 | 11/1991 | Langewellpott | 375/232 |
| 5,081,651 | 1/1992 | Kubo | 375/341 |
| 5,151,919 | 9/1992 | Dent | 375/1 |
| 5,164,961 | 11/1992 | Gudmundson | 375/229 |
| 5,186,764 | 2/1993 | Stiasny | 148/206 |
| 5,199,047 | 3/1993 | Koch | 375/231 |
| 5,222,080 | 6/1993 | Wang et al. | 375/99 |
| 5,297,169 | 3/1994 | Backström et al. | 375/231 |
| 5,335,250 | 8/1994 | Dent et al. | 375/224 |
| 5,343,473 | 8/1994 | Cidon | 370/85.6 |
| 5,537,397 | 7/1996 | Abramson | 370/18 |
| 5,557,608 | 9/1996 | Calvignac | 370/60 |
| 5,615,209 | 3/1997 | Bottomley | 370/342 |

FOREIGN PATENT DOCUMENTS

| | | |
|---|---|---|
| 491 668 | 6/1992 | European Pat. Off. |
| 526 439 | 2/1993 | European Pat. Off. |
| WO97/05708 | 2/1997 | WIPO |

OTHER PUBLICATIONS

K. Giridhar et al., "A Blind Adaptive MAP Algorithm for the Recovery of Cochannel Signals," *Proceedings of the Military Communications Conference*, pp. 133–138.

M.J. Ready et al., "Demodulation of Cochannel FSK Signals Using Joint Maximun Likelihood Sequence Estimation," *Proceedings of the Asilomar Conference*, pp. 1412–1415, Nov. 1993.

U. Fawer et al., "Multiuser Reception for Trellis–Based Code Division Multiple Access Communications," *Proceedings of the Military Communication Conference*, pp. 977–981, Oct. 1994.

A.J. Viterbi, "Very Low Rate Convolutional Codes for Maximum Theoretical Performance of Spread–Spectrum Multiple–Access Channels," *IEEE Jrnl Sel. Areas in Comm.*, vol. 8, No. 4, pp. 641–649, esp. section IV, May 1990.

M.K. Varanasi et al., "Near–Optimum Detection in Synchronous Code–Division Multiple–Access Systems," *IEEE Trans. on Comm.*, vol. 39, No. 5, pp. 725–736, May 1991.

M.C. Phillips, "Acquisition in Spread Spectrum Multiple Access Communication Systems," M.S. Thesis, Univ. of Utah, esp. section 4.2.1, Jun. 1995.

T. Sugiyama et al., "Burst Mode Interference Cancellation for Superposed Transmission of SSMA–QPSK Signals and TDAM–QPSK Signals in Nonlinear Channels," *Proc. GLOBECOM '93*, vol. 3, pp. 1612–1616, Nov. 1993.

*Primary Examiner*—Douglas W. Olms
*Assistant Examiner*—Matthew C. Phillips
*Attorney, Agent, or Firm*—Burns, Doane, Swecker & Mathis, L.L.P.

[57] ABSTRACT

A system for transmitting digital data messages between a plurality of stations using a common communications channel is disclosed. The data messages are assembled into data packets which include address and control information. The data packets are then transmitted from the stations over the common channel using appropriate data representative waveforms or modulation. A composite waveform representative of the data packets including potentially time overlapping data packets are received and processed to decode at least one packet. The waveform representative of the at least one decoded packet is reconstructed and subtracted from the received composite waveform to obtain a residual waveform. The residual waveform is then further processed to attempt to decode at least one further packet.

10 Claims, 5 Drawing Sheets

Fig. 1

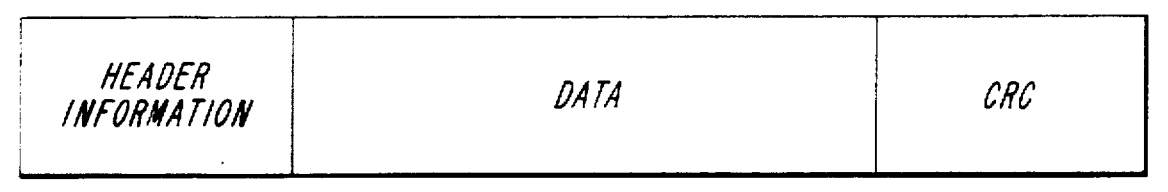

| HEADER INFORMATION | DATA | CRC |
|---|---|---|

# 5,764,646

PACKET DATA TRANSMISSION WITH CLASH SUBTRACTION

FIELD OF THE INVENTION

The present invention relates to packet data transmission systems, and more particularly to a method for controlling packet data clash control problems in pocket data transmission systems.

BACKGROUND OF THE INVENTION

Packet data systems include systems for transmitting data by radio between two or more parties as well as systems for exchanging data by optical fiber or wire line connections, including systems known as local area networks (LANs). A common characteristic of packet data systems is that contention is permitted between two or more receivers. Contention occurs when two or more transmitters happen to attempt to use the same channel at the same time causing a clash. Various means are employed to cope with the incidence of clashes, the most important of which is automatic request for retransmission (ARQ).

In a packet data system, data for transmission are assembled into deterministic sized blocks. Addressee-addressor information is usually added, as well as error correction coding or detection information to form a packet as illustrated in FIG. 1. A packet preferably also contains a packet number, and data packets for transmission in one direction often carry acknowledgments of packets received in the other direction. This is known as carrying acknowledgments "piggy-back". If a transmitter does not receive acknowledgment of a previously transmitted packet after a predetermined delay, it will retransmit the packet in preference to a new packet. More specifically, all transmitted packets are also entered into a retransmit delay queue or pipe. If they are not acknowledged or removed from the retransmit queue before they emerge from the pipe, then priority is given to the retransmit queue instead of the new data queue. When a packet is retransmitted, it is also reentered into the beginning of the retransmit pipe, so that if the pocket again goes unacknowledged, it will be retransmitted again and again until it is acknowledged. In this way, packet data systems can be accorded the property of guaranteed message delivery, eventually.

To provide packet data systems with robustness against temporary loss of packets on the reverse or acknowledgement link, it is preferable to employ a cumulative acknowledgment. This involves acknowledging not the latest received packet but the highest packet number in a successfully received sequence with no gaps. For example, if packets . . . 5, 6, 8, 9, 10 . . . have been received, the acknowledgment number will only be 6, reflecting the fact that packet 7 is missing. As soon as a retransmission of packet 7 is successfully received however, the acknowledgment number can jump ahead to 10 or to the beginning of the next gap. In this way, all of the packets that have been received successfully can be cleared out of the retransmission pipe without needing an individual acknowledgment for each packet to be received.

Packet data systems are often configured as a "net" in which every member can in principal receive information for every other member. In a packet radio system, members can act as relays for packets that fail to reach their destination directly from the source. In this case, it is of interest for members also to be able to receive packets not intended for them so that they may assist in their relay if necessary. Thus, if an intended packet is destroyed by a clash with a stronger non-intended packet, it is still of interest to receive and decode the stronger packet.

Due to different propagation delays and/or random transmitter timing, an interfering packet may be received halfway through the processing of an earlier received packet. In the prior art, receivers are known that can detect the onset of a clash from a stronger packet and abort processing of the weaker packet. In this case, at least the stronger packet is decoded which may be required to be relayed to another member of the packet data net. However, the weaker packet is lost. This process is called preemption, and the packet data receiver can be preempted if reception of a stronger packet begins during an already started packet decoding operation.

A packet data system employing the above techniques to increase robustness against clashes achieves maximum throughput when loaded with an optimal amount of traffic. This maximum traffic carrying capacity occurs when the attempt to increase the number of new packets transmitted would increase the number of clashes and thus the number of old packets retransmitted by more than the attempted traffic increase, thus reducing the throughput. It is an object of the present invention to allow a significant improvement in the throughput by a more effective method of clash control than is known in the prior art.

SUMMARY OF THE INVENTION

According to one embodiment of the present invention, a packet data transmission system can be constructed having the usual strategies for message reliability control, including cumulative acknowledgments, automatic retransmission, relay assistance, error correction coding, addressee-addressor information, and packet numbering. In addition, the present invention includes a more powerful clash control means which includes subtraction of the signal waveform of a successfully decoded packet so that an underlying packet may be decoded.

According to another embodiment of the present invention, a system for transmitting digital data messages between a plurality of stations using a common communications channel is disclosed. According to the present invention, the data messages are assembled into data packets which include address and control information. The data packets are then transmitted from the stations over the common channel using appropriate data representative waveforms or modulation. A composite waveform representative of the data packets including potentially time overlapping data packets are received and processed to decode at least one packet. The waveform representative of the at least one decoded packet is reconstructed and subtracted from the received composite waveform to obtain a residual waveform. The residual waveform is then further processed to attempt to decode at least one further packet.

BRIEF DESCRIPTION OF THE DRAWINGS

An arrangement according to the invention will now be described in more detail with reference to an accompanying embodiment thereof illustrated in the accompanying drawings, in which:

FIG. 1 illustrates a packet;

DETAILED DESCRIPTION

In U.S. Pat. No. 5,151,919, which is incorporated herein by reference, a novel technique for demodulating overlapping signals, i.e., a composite signal, alternatively in descending signal strength order starting by demodulating the strongest and then subtracting it out of the composite signal before demodulating the next strongest is disclosed. At each stage, the sum of the underlying interferers should not be so great as to prejudice the decoding of the strongest. Thus, the number of overlapping interferers that can be tolerated depends on the desired signal to interference ratio (C/I) and on the signal strength distribution.

Figure 2:
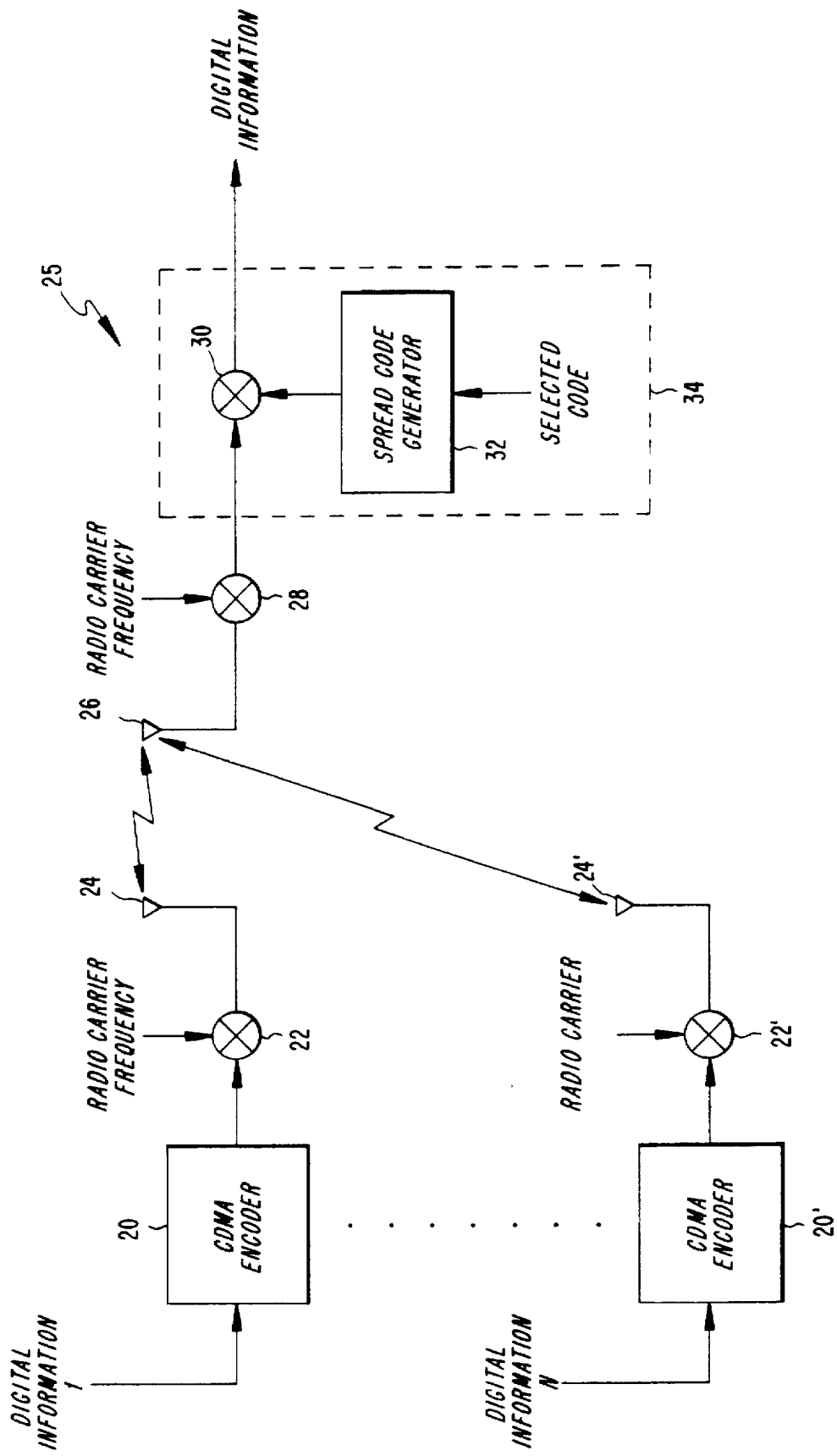
FIG. 2 is a fundamental schematic of a CDMA transmitter and receiver.

FIG. 2 illustrates a conventional CDMA system. Digital information to be transmitted over an RF communication channel is coded in a CDMA encoder 20. The coded signal is used to modulate an RF carrier in a mixer 22. The modulated carrier is transmitted over the air interface via a transmitting antenna 24. Other digital information from other transmitters (2 . . . n) may be transmitted in a similar fashion. A receiving antenna 26 of a radio receiver 25 receives a composite RF signal and demodulates the composite signal using another mixer 28. The desired signal is extracted from the composite signal by multiplying the corresponding code used to originally code the desired signal in the CDMA encoder 20 with the composite signal. In theory, only the appropriate signal is correlated and reconstructed in a decoder 34.

Figure 3:
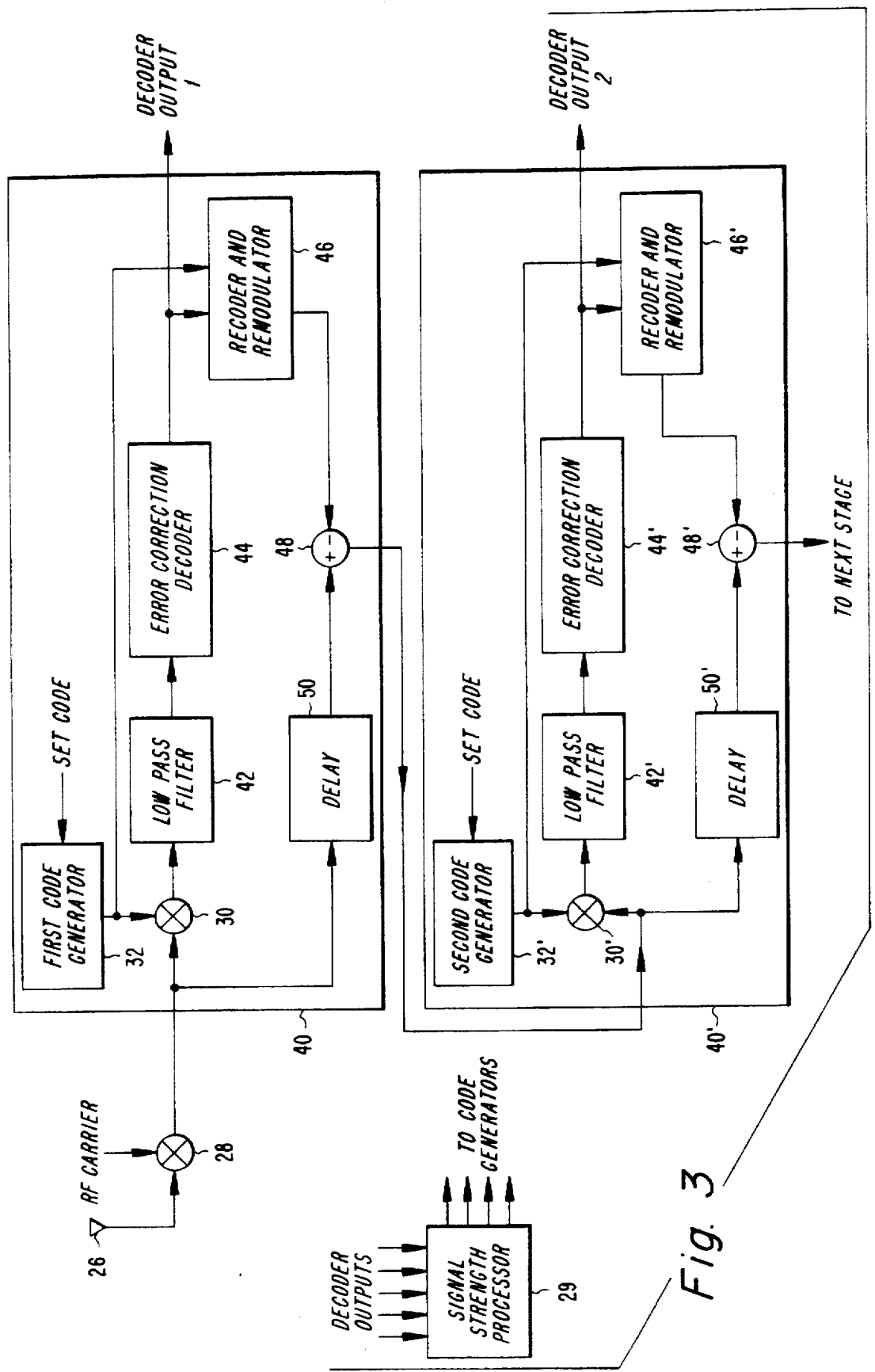
FIG. 3 is a functional schematic of a CDMA subtractive demodulator according to one embodiment of the present invention.

A detailed embodiment of the decoder 34 will now be described in conjunction with FIG. 3. A multiplicity of coded signals overlapping in the same communications channel are received at the antenna 26 as a composite RF signal. The demodulator 28 converts the received RF signal to a convenient frequency for processing. Such a convenient frequency may, for example, lie around zero frequency (DC), and the composite signal may consist of complex factor components having real and imaginary I and Q components.

A first digital processing block 40 includes a first code generator 32 set to match the code of the first signal to be demodulated. While the specific code to be set by the code generator 32 in the first data processing block 40 may be selected arbitrarily, in the preferred embodiment of the present invention, the order in which the codes are generated is based on signal strength. A signal strength processor 29 monitors the relative signal strength of each of the signals that make up the composite signal. In the context of cellular systems, if the mobile switching center (MSC) or the base stations (BS) monitor the probable or actual signal strengths of each mobile telephone communication, either the MSC or the BS may perform the task of the signal strength processor 29.

Figure 4:
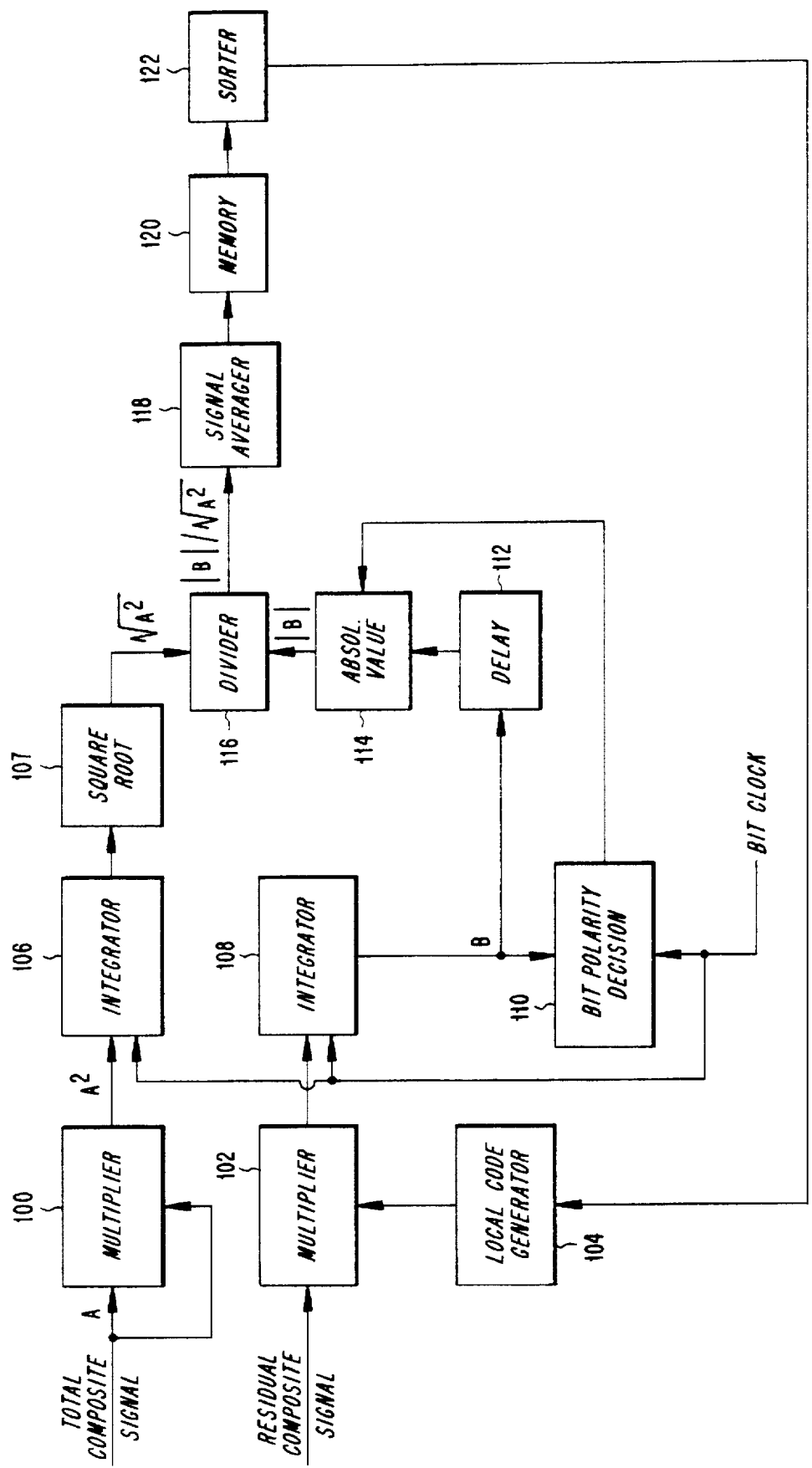
FIG. 4 is a functional schematic of a signal strength processor illustrated in FIG. 3.

It will be appreciated that signal strength can be detected by the signal strength processor 29, or it can be predicted based upon historical models of signal strength. A functional block diagram depicting a hardware implementation for performing the functions of the signal strength processor 29 will now be described in conjunction with FIG. 4. It will be appreciated by those skilled in the art that these functions could also be implemented using a suitably programmed microprocessor. The total composite signal received by the antenna 26 is squared in a multiplier 100, and integrated in an integrator 106 over the number of chip periods in a bit period. A bit clock signal determines the integration interval. A square root circuit 107 determines the root mean square (RMS) value of the composite signal over the bit period.

At the same time, the residual signal is received in a multiplier 102. The residual signal comprises the total composite signal minus any prior decoded signals. The residual signal is multiplied by a spreading code generated by a local code generator 104 of the signal to be decoded. The correlated output signal from the multiplier 102 is also integrated over the same bit period in an integrator 108, as controlled by the bit clock signal. The average or integrated voltage value over the integrated time period may have a positive and negative polarity. Thus, a bit polarity decision device 110 detects a signal polarity and transmits a signal to an absolute value device 114 which ensures that the sign of the output signal of the integrator 108 delayed by a delay 112, is always positive. The absolute value device 114 may for example, be an inverter controlled by the bit polarity decision device 110.

The absolute value of the average correlation signal (B) is divided in a divider 116 by the square root of the RMS value of the total composite signal squared ($A^2$) for the same bit period to generate a normalized value. In other words, the correlated strength of the decoded signal B is normalized by dividing it by the total composite strength of the signal for that bit period. The normalized correlation of the decoded signal is accumulated in a signal averager 118 over a number of bit periods to generate a relative mean strength for that decoded signal. Due to multipath fading of the signal, the actual number of bit periods should probably be on the order of about 10 in order to determine an accurate average signal of the demodulated signal. Each local code is stored in a memory 120 along with its associated average strength value. A sorter 122 compares each of these average signal strength values and sorts them from strongest to weakest. At that point, the sorter 122 transmits the local spreading code of the strongest signal to the local code generator 104 so that the strongest signal is always demodulated and extracted at the next data bit period. Lesser strength signals are demodulated in order of signal strength as determined by the sorter 122. The functions of the sorter 122 may be readily implemented by a processor using a software sorting program.

Because the signal strengths of the multiple mobile stations in a cell are constantly varying, a further embodiment of the present invention utilizes linear predictive analysis (LPA) to reorder the signal strength priority. In general terms, a historical model of the relative signal strengths is stored in a memory and used to extrapolate which signal is most likely to have the greatest strength at the next instance in time. The LPA postulates that the next value of a waveform will be a weighted sum of previous values with the weight coefficients to be determined. The known filter algorithm may be used to implement this analysis. In this manner, the strongest signal may be predicted effectively without having to actually perform another sequence of signal decoding and measurements.

If the signal strength processor 29 determines that the actual results of the coding of a composite signal and signal strength priority sequences are in error because of an inaccurate prediction or because system conditions have changed, the signal strength processor 29 reorders the code sequence to reflect the actual signal strength order. Subsequently, the modulation process may be repeated to ensure that the individually coded signals of the composite signal are decoded in the order of greatest signal strength to least signal strength. The repeated process does not result in the loss of data or interruption in traffic because the composite signal is stored in a delay 50 in the processing block 40. The delay 50 may be simply a memory device. Consequently, the composite signal may be retrospectively reprocessed once the optimum order of decoding is determined.

By decoding the output signal of the first code generator 32 with the composite signal received at the correlator 30, an individual signal corresponding to the first code is extracted from the composite signal. The correlated signal is filtered in a lowpass filter 42 in order to reject interference generated by noise and unrelated signals. Instead of the lowpass filter 42, a majority vote circuit or an integrate and dump circuit may be used to reduce or despread the bandwidth or bit rate of the correlated signal. The output signal generated by the lowpass filter 42 is processed further in an error correction decoder 44 which finally reduces the signal strength or bit rate to the underlying digital information. The decoded information signal may undergo additional signal processing before it reaches it's final destination.

The error corrected output signal is also applied to a recorder/remodulator 46 to reconstruct the waveform of the signal just decoded. The purpose for reconstructing/recoding the decoded signal is to remove it from the composite signal in a subtractor 48. A delay memory 50 stores the composite signal for the processing time required to first decode and then reconstruct the first decoded signal.

The residual composite signal, from which the first signal has been decoded and subtracted, is passed from the subtractor 48 to the input of a second digital processing block 40' which is similar to the first block 40. The only difference between the two digital processing blocks 40 and 40' is that the code generator 32' is programmed to match the code corresponding to a second signal to be demodulated. In the preferred embodiments of the present invention, the second signal to be demodulated is the signal having the next greatest signal strength. Those skilled in the art will recognize that the second signal processing block 40' may be implemented by recursive use of the first signal processing block 40 in order to avoid duplicating hardware. The second signal processing block 40' produces a second decoded signal from the error correction decoder 44' and subtracts a reconstructed, second signal from the delayed composite signal in a subtractor 40'. The residual, composite signal, with two signals now removed, is passed to a third stage of signal processing and so on.

Applying the principle described above to the packet data clash control problem, it is possible to demodulate the stronger of the two signals so that the demodulator can function at a C/I ratio of one or greater, since the C/I ratio must be greater than unity if the larger signal is on the numerator and the smaller signal is on the denominator. The capability of the demodulation can be ensured if necessary by use of a sufficient amount of intelligent bandwidth expansion through coding. Even if the modulation method chosen needs a higher C/I ratio than unity, it is possible to demodulate simultaneously two or more overlapping signals of similar level by use of joint demodulation. Joint demodulation involves simultaneously hypothesizing one transmitted symbol for each of the overlapping modulations and using those postulates to estimate the sum signal that should be received. The actual received signal is then compared with the estimated sum signal and the hypothesis that best matches the received signal is retained. When symbols are received from N transmitters synchronously, the joint demodulator approach can be implemented by means of a Viterbi sequence maximum likelihood estimator of M to the power 2N-1 states, where M is the size of the symbol alphabet (M=2 for binary).

According to the present invention, a packet data transmission system can be constructed having the usual strategies for message reliability control including preemption cumulative acknowledgements, automatic retransmission, relay assistance, error correction coding, addressee-addressor information and packet numbering. In addition, the packet data receiver embodies a more powerful clash control means than the prior art. The clash control means according to the present invention includes subtraction of the signal waveform of a successfully decoded packet so that an underlying packet may be decoded. A packet radio receiver normally contains a correlator for detecting a known bit pattern indicating the arrival of a packet. The correlator may first trigger in response to a packet received at low signal levels and decoding of the packet begins. The correlator meanwhile is left running to detect the potential arrival of another, overlapping packet. If the correlator triggers before completion of decoding the first packet, the decoding is suspended but the state of the decoder is saved in memory, e.g., on a "stack." The decoder then begins decoding the new packet which "preempted" the first packet. Upon completion of decoding the second packet, its reconstructed waveform is subtracted from the signal leaving a residual. The decoding of the original packet is then resumed by "popping" the saved decoder state off the stack and continues processing the residual. In principle, the second packet may in turn have been pre-empted by a third, even stronger packet, and a second set of decoder states are saved on the stack, next to the first-saved states. After the third packet has been decoded and subtracted, the second set of states is retrieved from the stack to complete decoding and then after its subtraction, the residual would be processed again to complete decoding of the first packet. In principle, no clashed packet need be lost, but there will be a practical limit on how many simultaneous clashes can be resolved.

Preemption operates in the following manner. The received signal is continuously sampled, digitized and fed into a buffer memory using any one of the known radio or wireline signal AtoD conversion techniques as appropriate. For example, in the radio case, the log polar technique described in U.S. Pat. No. 5,048,059 which is incorporated herein by reference, is well adapted to the digitization of intermittently arriving signals of unpredictable level.

Each packet can include a number of known symbols that are continually searched for in the buffer memory samples using a sliding digital correlator. If the correlator reaches a sufficiently high level of correlation which indicates the presence of the known simple pattern, a packet for decoding is deemed to exist and a decoding operation is commenced using the position in the sample buffer indicated by the correlator. During this decoding operation, the correlator continues to search on a sliding basis for receipt of a later packet. If a later packet is received at a sufficiently strong level, the correlator will again trigger which initiates another decoding operation. If only one decoding operation can be carried out at a time, the decoding operation having the greatest initial correlation value is preferably completed first. If successful, as indicated, for example, by a cyclic redundancy check (CRC) code, the signal waveform just decoded is reconstructed and subtracted as disclosed in U.S. Pat. No. 5,151,919. Any suspended decoding operation is then resumed, if necessary, by back tracking to the point before the onset of the just subtracted packet, so as to avoid any errors caused by delay in detecting the clash. This can alternatively be avoided by arranging the correlator to search somewhat ahead of the buffer sample currently being decoded.

The process of preemption, decoding, clash subtraction, and resumption is preferably iterative so that all packets initially detected by the correlator but whose decoding was suspended are eventually decoded completely. A person of normal skill in the art will recognize that such decoding operations can be performed by a programmable signal processor (DSP) and that saving the state variables of a preempted decoding operation in order to perform another operation can be achieved by the known techniques of using a stack for temporary variables, in the form of programming known as recursive or re-entrant. Eventually, after decoding the earliest detected packet and subtracting it, the entire buffer can be processed again to see if the correlator is now able to detect any weaker underlying packets that earlier were masked by the packets that were just subtracted from the composite signal.

All packets discovered and successfully decoded by the above means are assembled according to the addressee/addressor information and packet number into messages. If the current receiver is engaged to relay any of these messages, it must initiate its transmitter to acknowledge the highest packet number received with no gap. It does this by constructing the packets for transmission to the transmitter from which they were just received including data for reverse transmission through that station plus a piggy-back acknowledgement for a particular message sequence. The packet for transmission is then entered into the transmit queue. A full description of the techniques whereby a station determines if it is required or not to relay a particular packet or message can be found in the prior art.

The above description is focused on clash elimination by subtraction of already decoded packets. For situations where two overlapping packets of similar signal level cannot be decoded in this way, the joint demodulation technique can be employed instead. For brevity, this will be described at the same time as an alternative technique for correlation of packet detection.

The use of a Cyclic Redundancy Check (CRC) code to determine whether a packet has been successfully decoded has already been discussed. It is also possible to perform a CRC check on a sliding window after processing every sample, so as to detect whether that sample represented the end of a valid message. In this way, the CRC check also performs the function of message detection. Analysis and simulation has shown that sliding CRC checks can result in false indications of one or more symbols early or late in the message processing. According to one aspect of the present invention, this can be prevented either by the use of bit sequence scrambling before transmission and unscrambling prior to decoding, whereby the use of a modulo-additive scrambling mask is modulo-subtracted at the receiver before decoding. If the scrambling mask is subtracted on the wrong shift, it will not cancel the mask applied at this transmitter and thus will not decode a valid message. By using one or both of these means, false CRCs on a message shift are prevented.

Figure 5:
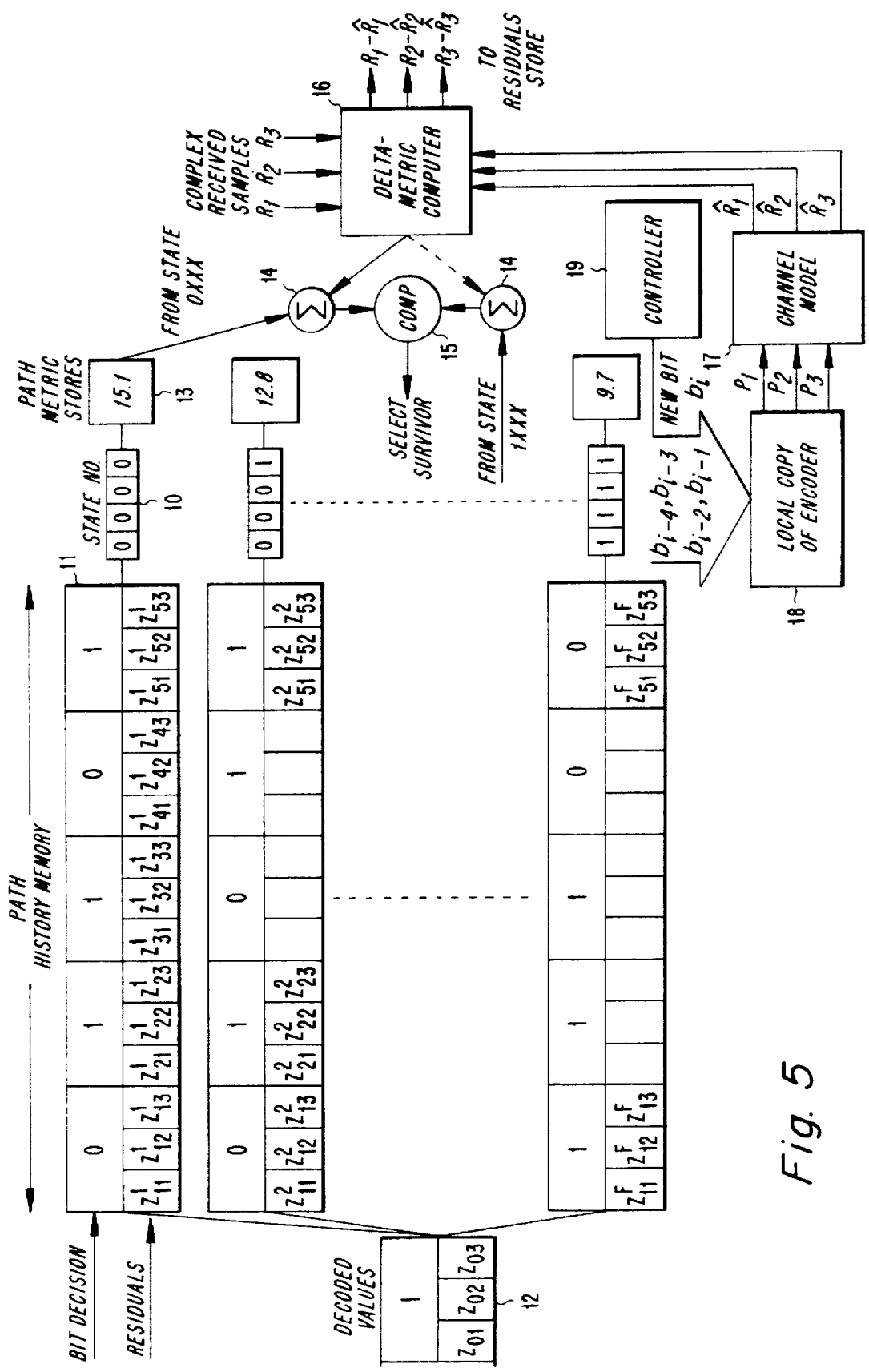
FIG. 5 illustrates a Viterbi Decoder for packet clash subtraction according to one embodiment of the present invention.

According to the joint demodulation scheme, all samples are regarded as potential starting points for all messages. FIG. 5 shows a Viterbi decoder structure for decoding and subtracting a data packet. While this FIG. 5 shows the essential elements, other elements of a packet processor have been omitted for simplification, such as sync correlation and channel estimation, deciphering, header decoding, CRC error detection and such like. It shall be understood that the omitted elements are intended to form part of a complete implementation of the invention, but are not material to a description of the Viterbi processor.

The Viterbi processor accepts digitized signal samples from the radio receiving chain in the form of complex numbers at the coded symbol rate. The following description is based on the arbitrary assumption that data transmitted in the packet has been coded with a rate ⅓rd convolutional code, but other codes and rates can equally well be used.

The Viterbi processor then processes received samples in triples, corresponding to the choice of a rate ⅓rd code which produces three coded symbols for every original information symbol. After each processing cycle, one additional original data symbol is decoded and a corresponding triple of residual complex values is output, equal to the corresponding three received signal samples with a best estimate of the decoded signal subtracted out. Successive triples of residuals form an output stream which can be processed again by a like Viterbi processor in order to decode an underlying packet that was masked by the packet just decoded.

With reference to FIG. 5, the operation of the signal-subtractive Viterbi processor will now be described. The decoder comprises a number of state memories each corresponding to an as-yet unresolved number of hypotheses of information bit sequences. Each sequence is identified with the latest L−1 bits hypothesized, where L is the constraint length of the code. If L=5, as exemplified in FIG. 7, this results in $$2^{L-1}=2^4=16 \text{ states}$$

as indicated by the binary state numbers 10.

Associated with each of the numbered states is a path history memory 11 containing the history of bit hypotheses that led to that state, and a corresponding set of residual triples denoted by $$z_{ij}^k$$

where i signifies the index of the bit the triples was associated with, j identifies one of the three complex values of the triple, and k identifies which state the candidate value of $Z_{ij}$ is stored in.

Also associated with each state is a path metric store 13 containing a value indicative of the likelihood that the hypothesized bit sequence is the sequence that was transmitted to the receiver. A cycle of decoding is controlled by controller 19.

For each of the old states, the controller appends a new bit hypothesis (b)i and together with the four bits of the state number obtains a number of its equal to the encoder constraint length (block length), i.e., five bits in the current example. The block of bits is submitted to a local copy of the encoder process 18 to obtain the encoded bit triple that would be expected to be received if the five bits are hypothesized correctly. These three coded bits P1, P2, P3 are then processed using a channel model 17 which models how the transmission path from the transmitting encoder to the input of the delta-metric computer 16 affected the coded bits. A radio channel can include, as well as radio path attenuation, applying a phase-angle rotation to transmitted signals and adding delayed versions of the signal giving rise to intersymbol interference. The effects of the channel may be estimated using a known bit pattern or syncword which is also useful in detecting the start of a packet. Channel estimates initially made with the aid of a syncword may be updated after decoding each bit using techniques disclosed in the following applications, which are hereby incorporated herein by reference: U.S. Pat. No. 5,063,573; U.S. Pat. No. 5,185,764; U.S. Pat. No. 5,164,961; U.S. Pat. No. 5,199,047; U.S. Pat. No. 5,081,651; U.S. Pat. No. 5,297,169; U.S. Pat.

No. 5,335,250; U.S. Pat. No. 5,577,068; U.S. Pat. No. 5,577,645; and U.S. Pat. No. 5,673,291.

The above-incorporated patents and applications provide precedence for making estimates of the propagation path characteristics with the aid of known bit patterns, as well as for updating the estimates after decoding unknown bits.

The latter patent application also provides precedence for the technique of demodulating and decoding a signal simultaneously, as is done in the preferred implementation of the present invention. Thus, the parameters of the channel model 17 may be initially estimated and subsequently updated. The channel parameters are the used to convert the coded bit Boolean values P1, P2, P3 into expected received complex values R1, R2, R3 which are compared with actually received values R1, R2, R3 in delta-metric computer 16. The Delta-metric computer 16 forms a triple of residuals:

$$Z_{i1}^k = R1 - R1$$

$$Z_{i2}^k = R2 - R2$$

$$Z_{i3}^k = R3 - R3$$

where the R-estimates are being computed using the bits of state number k.

The sum of the squares of the three residuals is also computed as the delta-metric value for that hypothesis. The delta-metric value is added in adder 14 to the previous path metric value retrieved from the path metric store number k to obtain a candidate for the updated path metric. Candidate path metrics are computed in this way for pairs of states whose binary state number differs only in the leftmost bit position, corresponding to the oldest unresolved bit hypothesis. Each pair of candidate path metrics is compared in comparator 15 and the lower of the two is identified. The best predecessor state is then identified as the state from which the new metric was derived by adding a delta-metric.

The lower metric becomes the new metric for a successor/survivor state whose number is obtained by shifting to the left place the binary digits of the state numbers (k, k+8) of the predecessor states just processed, the oldest bit falling out of the left being dropped and the newest hypothesized bit by being shifted into the first position. In addition, the old contents of the path history memory associated with the best predecessor state are shifted to the left one place to become the path history of the successor state, with a 1 or a 0 being shifted in at the right hand end according as the best predecessor state was number k or number k+8.

Moreover, the string of residual triples (z-values) in the path memory of the best predecessor state is left-shifted by one triple to become the residual string stored in the path memory of the successor state, the newly-calculated triple from the delta metric computer 16 associated with the best predecessor shifting in to the right hand end of the residual memory.

When all pairs of states have been processed with a new bit hypothesis of both 0 and 1, the number of successor states is the same as the original number of states and the path history memories have been lengthened by one entry. The leftmost (oldest) entry, comprising a residual triple and a decoded bit value, is then selected from the state having the lowest path metric to be shifted into the decoded values store 12. The path histories of all states are then shortened by one by deleting the oldest (rightmost) entry. This completes one cycle of decoding, returning the decoder to the original state but with updated values, and one extra entry in the decoded values store 12.

It may be seen that every decoded information bit passes through three parts of the decoder which may be described as:

Bit completely undecided (bit in the state number)
Bit partially decided (one of a number of candidates in Path History)
Bit finally decided (in the decoded values store 12)

The number of decoder cycles a bit remains in the "completely undecided" state is equal to the length of the state number in bits, which is one less than the constraint length of the code (the length of the encoding register). The number of decoder cycles that a bit remains in the "partially decided" state is equal to the length of path history memory 11 which is somewhat arbitrary. Experiments show that no significant improvement in decoder performance results from using path history lengths of more than about four constraint lengths—sometimes referred to as decision delay or decision depth. In certain cases where finite strings of bits are decoded, as in the case of data packets, it may be possible to avoid making the final bit decisions by truncating the path history, using a path history length approximately equal to the decoded block size. Then, each candidate block may be tested for compliance with an error detecting code, starting with the state having the lowest final path metric, as described in U.S. Pat. No. 5,577,053, Dent, filed Sep. 14, 1994, which is incorporated herein by reference. Using the teachings of the above reference, if, due to noise, the state with the lowest metric contains errors causing it to fail the error check, there is a chance that another state will pass the error check. When tail-biting (circular coding and decoding) is used, the decoder may also optionally continue reprocessing earlier signal samples again until some criterion for satisfactory decoding is satisfied.

At that point, according to the invention, the residuals associated with the finally decided information symbol sequence are also output from the decoder and represent the input signal with the best estimate of the just decoded packet subtracted out. The subtraction has occurred explicitly in the delta-metric computer 16 at the time the delta-metrics were formed. Many candidates for the signal packet to be subtracted were tested and the most likely one was finally selected together with the saved subtraction residuals. Saving the subtraction residuals in the Viterbi path history avoids the need to back track and use the finally-decoded data sequence in a retrospective subtraction. While this may save memory, it does not save computational effort as the process of using the decoded sequence in subtraction involves recoding it to form coded bit triples P1, P2, P3; operating on coded bit triples using the channel model 17; subtracting the estimated signal samples from the received signal samples and updating the channel model 17 to minimize the residual error. While such retrospective subtraction is avoided in the preferred implementation described above, it is not precluded from using retrospective subtraction, since this can in certain circumstances lead to better subtraction of the already decoded packet. This arises when updating of the channel model during the first pass is made according to one algorithm that is a compromise for best decoding unknown signals suffering from a range of signal fading rates, but after passing an error check indicating that the bit pattern is now accurately known. A second channel updating algorithm may be used during retrospective subtraction that is optimized for tracking any fading rate when the date pattern is known.

The final residual, however obtained, is concatenated with previous signal samples or similar residuals and resubmitted to the same type of packet processing to detect and decode any underlying weaker packet that could not be detected and decoded before subtraction of the overlying stronger packet.

The joint demodulation scheme must however be configured for a predetermined number of potential overlapping packets, for example, two. Each packet may be convolutionally encoded after any applied bit order or modulo-additive scrambling, and the joint demodulation scheme simultaneously attempts to decode two unknown, overlapping packets using a joint Viterbi SMLSE algorithm. After each new symbol has been processed, the decoded contents of the Viterbi states are checked for CRC by first applying a tentative descrambling. If this state does not hold a valid message, or if the tentative descrambling is applied to an incorrect data shift, no CRC will likely result. However, when the state continues to decode messages at the correct bit alignment, a CRC will result and that message can be extracted for further processing. Furthermore, the Viterbi SMLSE algorithm can prune out hypothesized states on which CRC did not check in order to improve the decoding probability of a possible second underlying packet. The Viterbi SMLSE algorithm can also be initialized to use the processing capability so released to search for yet a third packet.

When a Viterbi SMLSE algorithm is used, it is possible to save the errors between hypothesized and received signal waveform samples in the state memory. This actually represents the residual of the originally received waveform with the hypothesized message subtracted. It is possible to recursively process this residual again using any of the techniques already described to uncover weaker packets. In this way, all overlapping packets can in principle be decoded, all the way down to the signal strength limit imposed by noise.

It will be appreciated that a packet data system according to the present invention can be loaded up to a much greater traffic throughput level before multiple clashes degrade performance, than a system that can only decode the stronger of the two clashed packets with loss of the weaker one.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

I claim:

1. A system for transmitting digital data messages between a plurality of stations using a common communications channel, comprising:
    assembling means for assembling said data messages into data packets including address and control information;
    transmitting means for transmitting said data packets from said stations over said common channel using appropriate data representative waveforms or modulations;
    receiving means for receiving a composite waveform representative of said data packets including potentially time overlapping data packets;
    processing means for processing the received composite waveform to decode at least one packet;
    means for reconstructing the waveform representative of said at least one decoded packet and subtracting it from said received composite waveform to obtain a residual waveform wherein said residual waveform is subjected to further processing to decode at least another packet;
    means for preempting the processing of a packet when a stronger overlapping packet is received so that the stronger overlapping packet can be processed; and
    means for storing the state of the partially processed packet.

2. A system according to claim 1, wherein the first packet to be decoded has the greatest signal strength.

3. A system according to claim 2, wherein the next packet to be decoded has the next greatest signal strength.

4. A system according to claim 1, wherein a plurality of packets can be preempted and stored if stronger overlapping packets are received.

5. A system according to claim 4, wherein the strongest stored packet is selected for resumption of processing after the stronger overlapping packet has been processed.

6. A method for transmitting digital data messages between a plurality of stations using a common communication channel, comprising the steps of:
    assembling said data messages into data packets including address and control information;
    transmitting said data packets from said stations over said common channel using appropriate data representative waveforms or modulation;
    receiving a composite waveform representative of said data packets including potentially time overlapping data packets;
    processing the received composite waveform to decode at least one packet;
    reconstructing the waveform representative of said at least one decoding packet and subtracting it from said received composite waveform to obtain a residual waveform, wherein said residual waveform is subjected to further processing to decode at least another packet;
    preempting the processing of a packet if a stronger overlapping packet is received during said processing;
    storing the state of the partially processed packet;
    decoding said stronger overlapping packet;
    reconstructing the waveform representative of said decoded stronger overlapping packet and subtracting it from said received composite waveform to obtain the residual waveform; and
    resuming processing of said preempted packet.

7. A method according to claim 6, wherein a plurality of packets can be preempted and stored if stronger overlapping packets are received.

8. A method according to claim 7, wherein the strongest stored packet is selected for resumption of processing after the stronger overlapping packet has been processed.

9. A method according to claim 6, wherein the first packet to be decoded has the greatest signal strength.

10. A method according to claim 9, wherein the next packet to be decoded has the next greatest signal strength.

* * * * *